United States Patent
Nagamune et al.

(10) Patent No.: US 6,778,901 B2
(45) Date of Patent: Aug. 17, 2004

(54) COMMUNICATION NAVIGATION SYSTEM, COMMUNICATION NAVIGATION METHOD, TERMINAL UNIT, AND ROUTE GUIDANCE INFORMATION TRANSMITTING APPARATUS

(75) Inventors: Akira Nagamune, Tokyo-to (JP); Hiroshi Miyahara, Tokyo-to (JP)

(73) Assignees: Pioneer Corporation, Tokyo-to (JP); Increment P Corporation, Tokyo-to (JP)

( * ) Notice: Subject to any disclaimer, the term of this patent is extended or adjusted under 35 U.S.C. 154(b) by 21 days.

(21) Appl. No.: 10/208,003

(22) Filed: Jul. 31, 2002

(65) Prior Publication Data

US 2003/0028313 A1 Feb. 6, 2003

(30) Foreign Application Priority Data

Aug. 1, 2001 (JP) .................................. P2001-233756

(51) Int. Cl.[7] ............................................. G01C 21/34
(52) U.S. Cl. ................... 701/202; 701/209; 701/211; 340/995.12; 340/995.2
(58) Field of Search .............................. 701/202, 209, 701/210, 211; 340/995.12, 995.19, 995.2

(56) References Cited

U.S. PATENT DOCUMENTS

| | | | |
|---|---|---|---|
| 5,187,810 A | 2/1993 | Yoneyama et al. | |
| 5,999,126 A | 12/1999 | Ito | |
| 6,097,316 A | 8/2000 | Liaw et al. | |
| 6,278,939 B1 * | 8/2001 | Robare et al. | 701/208 |
| 6,278,941 B1 * | 8/2001 | Yokoyama | 701/209 |
| 6,282,492 B1 * | 8/2001 | Gorai et al. | 701/209 |
| 6,320,518 B2 | 11/2001 | Saeki et al. | |
| 6,324,467 B1 | 11/2001 | Machii et al. | |
| 6,336,073 B1 * | 1/2002 | Ihara et al. | 701/202 |
| 6,542,816 B1 * | 4/2003 | Ito et al. | 701/209 |
| 6,587,787 B1 | 7/2003 | Yokota | |
| 2001/0007090 A1 | 7/2001 | Irie et al. | |
| 2002/0065606 A1 * | 5/2002 | Kawai et al. | 701/211 |
| 2003/0028314 A1 | 2/2003 | Nagamune | |
| 2003/0028317 A1 | 2/2003 | Nagamune | |
| 2003/0074130 A1 | 4/2003 | Negishi et al. | |
| 2003/0083851 A1 | 5/2003 | Nagamune | |

FOREIGN PATENT DOCUMENTS

EP          0 766 216 A1    4/1997

* cited by examiner

Primary Examiner—Gary Chin
(74) Attorney, Agent, or Firm—Nixon & Vanderhye, P.C.

(57) ABSTRACT

A communication navigation system includes a server that transmits items of route guidance information to terminal units via a communication network such as the Internet, a processing subsystem, provided in each terminal unit, for determining whether or not the items of route guidance information from the server are necessary, a display subsystem for performing guidance using only one or more items of route guidance information determined to be necessary by the processing subsystem, and a speech output subsystem.

22 Claims, 5 Drawing Sheets

COMMUNICATION NAVIGATION SYSTEM, COMMUNICATION NAVIGATION METHOD, TERMINAL UNIT, AND ROUTE GUIDANCE INFORMATION TRANSMITTING APPARATUS

BACKGROUND OF THE INVENTION

1. Field of the Invention

The present invention relates to communication navigation systems and methods, etc. for performing navigation by transmitting map data to navigation terminals via a communication network. More particularly, the invention is directed to a communication navigation system and method, etc. which does not complicate the system and which can easily take care of updated navigation terminals.

2. Description of Related Art

Various types of navigation systems have been proposed, which perform navigation by transmitting map data and route guidance information from a server, via computer and mobile communications networks including the Internet, to various types of navigation terminals, such as in-vehicle navigation units, portable navigation units, PDAs (Personal Digital Assistants) and cellular telephones, according to their request. Each of these navigation terminals presents a user with predetermined information visibly and audibly, based on position data detected by a GPS (Global Positioning System) receiver mounted thereon as well as map data and route guidance information transmitted from the server, to guide the user to his or her destination.

In these communication navigation systems, the route guidance information transmitted from the server plays an important role in guiding the user to his or her destination, together with the map data. However, each navigation terminal accepts only a type of route guidance information which is uniquely compatible with itself. For example, a navigation terminal may be updated to perform a guidance step by using some items of route guidance information which the navigation terminal as unupdated could not have processed. In addition, it would be user-friendly if some unnecessary route guidance information can be omitted visibly and/or audibly from a navigation terminal.

SUMMARY OF THE INVENTION

An object of the invention is to provide a communication navigation system and method, etc. which does not complicate the system and which can easily take care of updated navigation terminals through flexible control, when each of the navigation terminals involved accepts only such route guidance information as being uniquely compatible with itself.

A first aspect of the invention provides a communication navigation system that performs navigation, using map data stored in a map database site and current position data about navigation terminals, by transmitting the map data to the navigation terminals via a communication network. The communication navigation system is provided with: a route guidance information transmitting device which transmits items of route guidance information to each of the navigation terminals via the communication network; a determining device, provided at each of the navigation terminals, which determines whether or not the items of route guidance information transmitted by the route guidance information transmitting device are necessary; and a guidance device which performs guidance using only one or more items of route guidance information determined to be necessary by the determining device.

According to this communication navigation system, only items of route guidance information determined to be necessary by the determining device are used to implement guidance. Thus, even when each navigation terminal accepts only items of route guidance information uniquely compatible therewith, the route guidance information transmitting device no longer needs to process the information differently for each navigation terminal. A skipping device may be provided so that if the determining means determines that a current one of the items of route guidance information is not necessary, the processing of the current one of the items of route guidance information is skipped to cause the determining device to determine whether or not a next one of the items of route guidance information is necessary. In this case, the current one of the items of route guidance information may not be read by skipping as many bytes as its data size.

The communication navigation system may be provided with an input device which accepts an input of one or more items of route guidance information to be determined to be necessary by the determining device.

In this case, the guidance device can bypass a guidance step based on any item of route guidance information which the user thinks is unnecessary. The input device may be used so that the user can enter one or more items of route guidance information which he or she thinks are necessary or unnecessary.

Another aspect of the invention provides a communication navigation method for performing navigation, using map data stored in a map database site and current position data about navigation terminals, by transmitting the map data to the navigation terminals via a communication network. The communication navigation method is provided with: a route guidance information transmitting process for transmitting items of route guidance information to each of the navigation terminals via the communication network; a determining process, performed by each of the navigation terminals, for determining whether or not the items of route guidance information transmitted by the route guidance information transmitting process are necessary; and a guidance process for performing guidance using only one or more items of route guidance information determined to be necessary by the determining process.

According to this communication navigation method, only items of route guidance information determined to be necessary by the determining process are used to implement guidance. Thus, even when each navigation terminal accepts only items of route guidance information uniquely compatible therewith, the route guidance information transmitting process no longer needs to process the information differently for each navigation terminal. A skipping process may be provided so that if the determining process determines that a current one of the items of route guidance information is not necessary, the processing of the current one of the items of route guidance information is skipped to cause the determining process to determine whether or not a next one of the items of route guidance information is necessary. In this case, the current one of the items of route guidance information may not be read by skipping as many bytes as its data size.

The communication navigation method may be provided with an input process for accepting an input of one or more items of route guidance information to be determined to be necessary by the determining process.

In this case, the guidance means can bypass a guidance step based on any item of route guidance information which the user thinks is unnecessary. The input process may be used so that the user can enter one or more items of route guidance information which he or she thinks are necessary or unnecessary.

Still another aspect of the invention provides a terminal unit that executes a communication navigation method for performing navigation, using map data stored in a map database site and current position data about navigation terminals, by transmitting the map data to the navigation terminals via a communication network. The terminal unit is provided with: a determining device which determines whether or not the items of route guidance information transmitted by a route guidance information transmitting device are necessary, the route guidance information transmitting device in the map database site, which transmits items of route guidance information to each of the navigation terminals via the communication network; and a guidance device which performs guidance using only one or more items of route guidance information determined to be necessary by the determining device.

According to this terminal unit, only items of route guidance information determined to be necessary by the determining device are used to implement guidance. Thus, even when each navigation terminal accepts only items of route guidance information uniquely compatible therewith, the route guidance information transmitting device no longer needs to process the information differently for each navigation terminal. A skipping device may be provided so that if the determining procedure determines that a current one of the items of route guidance information is not necessary, the processing of the current one of the items of route guidance information is skipped to cause the determining device to determine whether or not a next one of the items of route guidance information is necessary. In this case, the current one of the items of route guidance information may not be read by skipping as many bytes as its data size.

The terminal unit may be provided with an input device for accepting an input of one or more items of route guidance information to be determined to be necessary by the determining device.

In this case, the guidance device can bypass a guidance step based on any item of route guidance information which the user thinks is unnecessary. The input device may be used so that the user may enter one or more items of route guidance information which he or she thinks are necessary or unnecessary.

Yet another aspect of the invention provides a route guidance information transmitting device that executes a communication navigation method for performing navigation, using map data stored in a map database site and current position data about navigation terminals, by transmitting the map data to the navigation terminals via a communication network, wherein the route guidance information transmitting device which transmits items of route guidance information to each of the navigation terminals via the communication network, the navigation terminals comprising: a determining device for determining whether or not the items of route guidance information transmitted by the route guidance information transmitting device are necessary; and a guidance device for performing guidance using only one or more items of route guidance information determined to be necessary by the determining device According to this route guidance information transmitting device, only items of route guidance information determined to be necessary by the determining device are used to implement guidance. Thus, even when each navigation terminal accepts only items of route guidance information uniquely compatible therewith, the route guidance information transmitting device no longer needs to process the information differently for each navigation terminal. A skipping device may be provided so that if the determining device determines that a current one of the items of route guidance information is not necessary, the processing of the current one of the items of route guidance information is skipped to cause the determining device to determine whether or not a next one of the items of route guidance information is necessary. In this case, the current one of the items of route guidance information may not be read by skipping as many bytes as its data size.

DETAILED DESCRIPTION OF THE PREFERRED EMBODIMENTS

A preferred embodiment of the present invention will now be described with reference to the drawings. In the following description, the preferred embodiment refers to a case where the invention is applied to a navigation system which includes terminal units mounted on vehicles, a server connected to the terminal units via a network such as the Internet, and the network, and which assists in driving the vehicles.

(General Configuration and Operation)

Referring to FIGS. 1 to 4, the general configuration and operation of the navigation system according to this embodiment will be described.

Figure 1A:
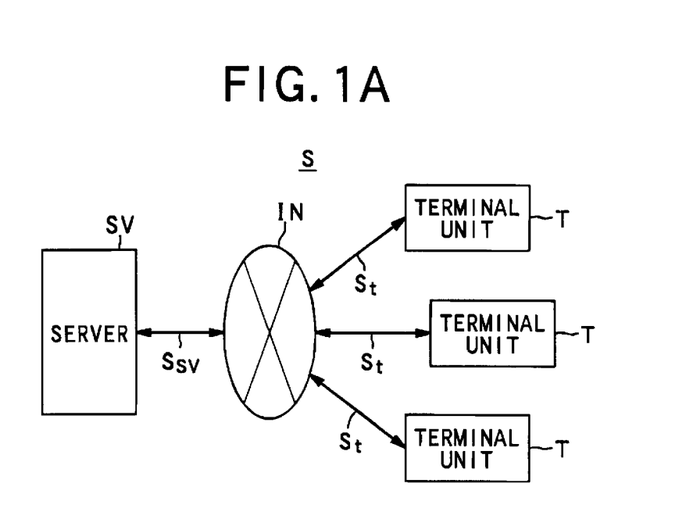
FIG. 1A is a block diagram showing the general configuration of a navigation system according to an embodiment of the invention.

As shown in FIG. 1A, the navigation system S according to this embodiment is provided with terminal units T, and a server SV. Each terminal unit T sends to the server SV a terminal signal St indicative of information such as vehicle's current position and travelling direction, as well as a request for information to be presented to a driver, and also receives from the server SV a terminal signal St indicative of various navigation process information corresponding to the request, and presents the requested information to the driver. Upon receipt of the terminal signal St as a server signal Ssv, the server SV searches for map information, etc. to be presented to the driver on the terminal unit T and performs processes (described below) including a route guidance process for his or her vehicle on which the terminal unit T is mounted, based on the received server signal Ssv, and then sends the processed results as a server signal Ssv to the terminal unit T. The terminal unit T and the server SV communicate with each other via the Internet IN.

As shown in FIG. 1A, only one sever SV is connected to a plurality of terminal units T so that the server SV can send to the terminal units T map and other information on a time division basis.

Figure 1B:
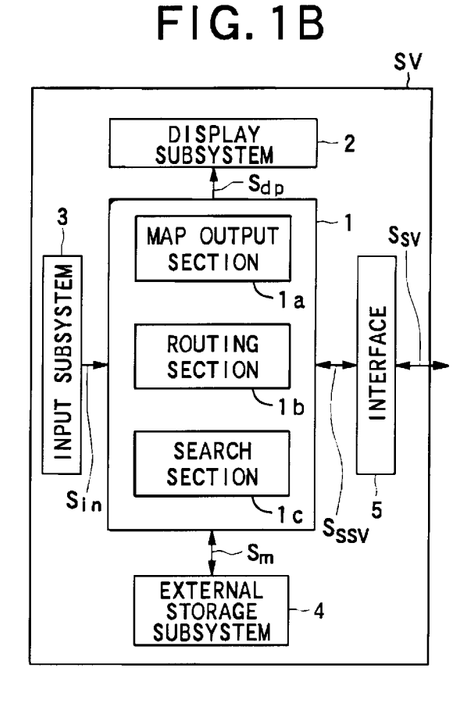
FIG. 1B is a block diagram showing a detailed configuration of a server according to the embodiment.
Figure 1C:
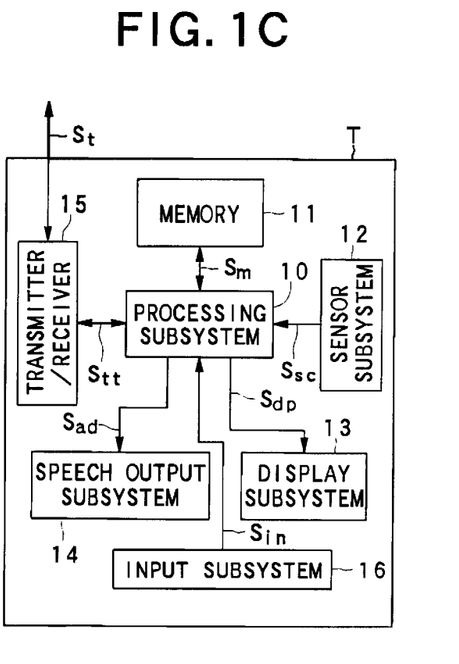
FIG. 1C is a block diagram showing a detailed configuration of a terminal unit according to the embodiment.

Referring next to FIGS. 1B and 1C, the detailed configuration of the navigation system S will be described.

As shown in FIG. 1B, the server SV comprises a CPU 1, a display subsystem 2, an input subsystem 3, an external storage subsystem 4 such as a hard drive, and an interface 5.

In the above configuration, the interface 5 appropriately interfaces an input server signal Ssv from the Internet IN to output the signal Ssv to the CPU 1 as a to-be-processed server signal Sssv, and also appropriately interfaces a processed server signal Sssv from the CPU 1 to output the signal Sssv to a terminal unit T as a server signal Ssv via the Internet IN.

The external storage subsystem 4 stores all information requisite for a navigation process performed by the navigation system S according to this embodiment, and outputs such information to the CPU 1 as a memory signal Sm, as needed. The information includes map information for display on each terminal unit T, various information used for a routing process (described below), point information for performing the navigation process according to this embodiment (more specifically, position information about points indicated on a map for display on the terminal unit T and descriptions of these points), and information about a user of the terminal unit T.

The CPU 1 is provided with a map output section 1a, a routing section 1b, and a search section 1c for its processing.

The map output section 1a searches for and reads, based on the request input as the to-be-processed server signal Sssv, map information corresponding to the request from among the map information stored in the external storage subsystem 4 as a memory signal Sm, and outputs the memory signal Sm to the terminal unit T via the interface 5 and the Internet IN as a processed server signal Sssv.

The routing section 1b calculates and finds, based on the request input as the to-be-processed server signal Sssv, a route along which the vehicle should travel, using the map information stored in the external storage subsystem 4, searches and reads the map information including the calculated and found route as a memory signal Sm, and outputs the memory signal Sm to the terminal unit T via the interface 5 and the Internet IN as a processed server signal Sssv.

Concurrently therewith, the routing section 1b generates route guidance information for guiding the vehicle having the terminal unit T aboard to move along the searched route, and outputs the searched result to the terminal unit T via the interface 5 and the Internet IN as a processed server signal Sssv. As will be described below, in this embodiment, the route guidance information to be sent via the Internet IN is not common to all the terminal units T connected to the system S, but is unique to each unit T.

The search section 1c searches for and reads, as a memory signal Sm, the point information, etc. stored in the external storage subsystem 4 based on the request input as the to-be-processed server signal Sssv, and outputs the memory signal Sm to the terminal unit T via the interface 5 and the Internet IN as a processed server signal Sssv.

The input subsystem 3 generates, upon entry of information necessary for the above operations, an input signal Sin corresponding to the entered information, and outputs the generated input signal Sin to the CPU 1. After having received the signal Sin, the CPU 1 performs its processing accordingly.

Information to be presented to an operator of the server SV during the above operations is output to the display subsystem 2 as a display signal Sdp so that information corresponding to the display signal Sdp is displayed on the display subsystem 2.

Then, as shown in FIG. 1C, a terminal unit T is provided with a processing subsystem 10 including a CPU and a memory, a memory 11, a sensor subsystem 12, a display subsystem 13, a speech output subsystem 14, a transmitter/receiver 15 such as a cellular telephone, and an input subsystem 16.

In this configuration, the transmitter/receiver 15 appropriately interfaces an input terminal signal St from the Internet IN to output a to-be-processed terminal signal Stt to the processing subsystem 10, and similarly interfaces a processed terminal signal Stt from the processing subsystem 10 to output a terminal signal St to the server SV via the Internet IN.

The sensor subsystem 12 is provided with a GPS receiver, a vehicle-speed sensor, and an acceleration sensor, and outputs information indicative of the vehicle's current position and attitude, etc. from the receiver and sensors, to the processing subsystem 10 as a sensor signal Ssc. The GPS receiver outputs absolute position information (absolute geographical latitude and longitude data) about a vehicle carrying the terminal unit T aboard, based on position information contained in GPS radio waves from a GPS satellite in orbit. The vehicle-speed sensor outputs distance and speed information by computing a distance traveled and a vehicle's speed based on so-called vehicle-speed pulses from a front wheel of the vehicle. The acceleration sensor detects turning angles and vertical inclinations of the vehicle to output information about the vehicle's travelling direction.

The input subsystem 16 generates, upon specification of a map for display on the display subsystem 13 or upon specification of a setting for the navigation process according to this embodiment such as a destination, an input signal Sin corresponding to the specification, and outputs the generated input signal Sin to the processing subsystem 10.

Based on these signals Ssc and Sin, the processing subsystem 10 generates information including current position information about the vehicle carrying the terminal unit T aboard, as well as a request, etc. corresponding to the specification made at the input subsystem 16. Then, the processing subsystem 10 outputs such generated information, request, etc. as a to-be-processed terminal signal Stt to the server SV via the transmitter/receiver 15.

Upon receipt of a processed terminal signal Stt via the Internet IN and the transmitter/receiver 15 from the server SV that has processed the to-be-processed signal Stt based on the current position information, request, etc., the processing subsystem 10 outputs the map information contained in the received processed terminal signal Stt to the display subsystem 13 as a display signal Sdp to display the map information thereon. The display subsystem 13 additionally displays information such as map information along the route generated by the routing section 1b within the server SV or routing information based on the route guidance information.

Of the route guidance information, audible messages to be given to the driver of the vehicle is output to the speech output subsystem 14 as an audio signal Sad, to implement the route guidance.

The processing subsystem 10 temporarily stores some information, such as the map information sent from the server SV, in the memory 11 as a memory signal Sm, which is then read, as needed, for proper indicator light processing.

(Navigation Process)

Figure 2:
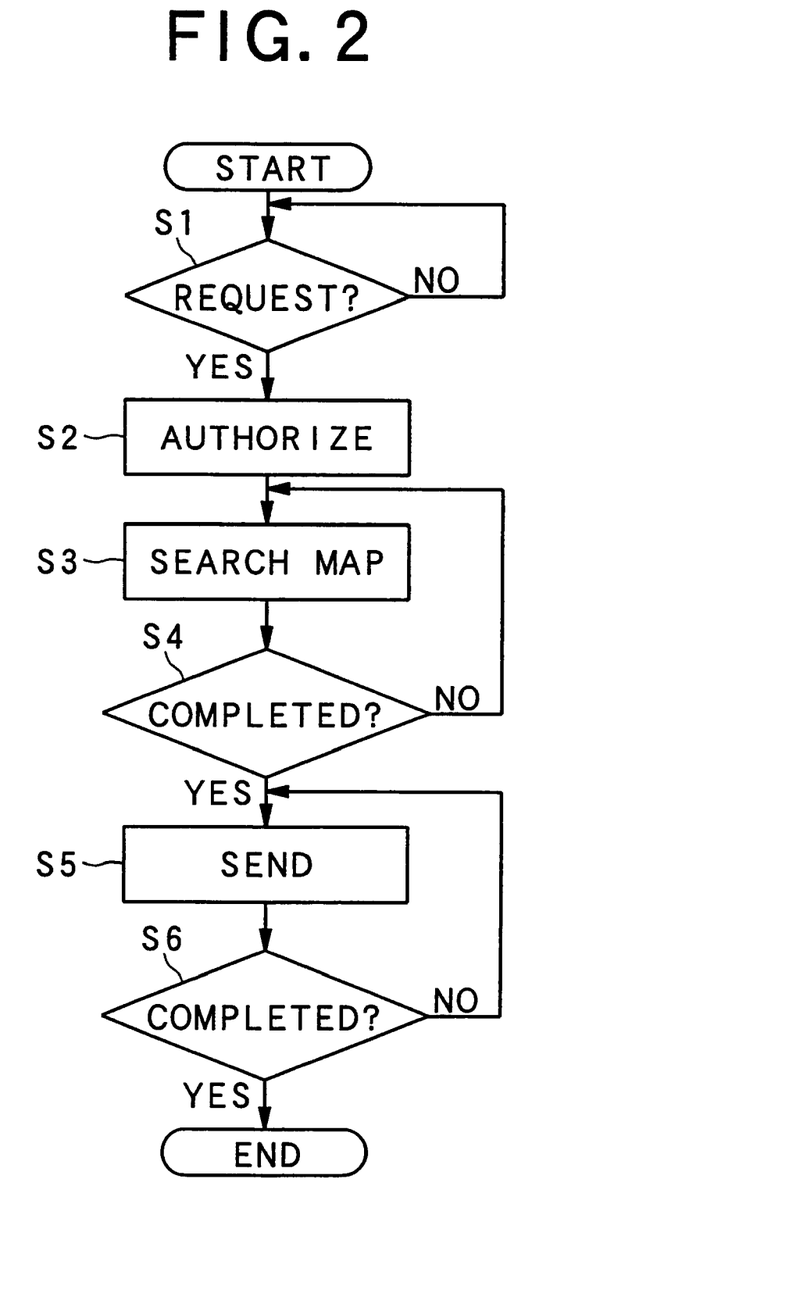
FIG. 2 is a flowchart showing a map search process according to the embodiment.
Figure 3A:
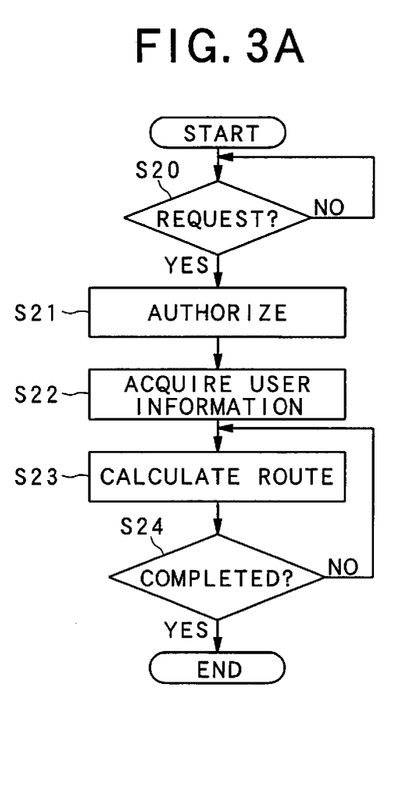
FIG. 3A is a flowchart showing a route calculation process according to the embodiment.
Figure 3B:
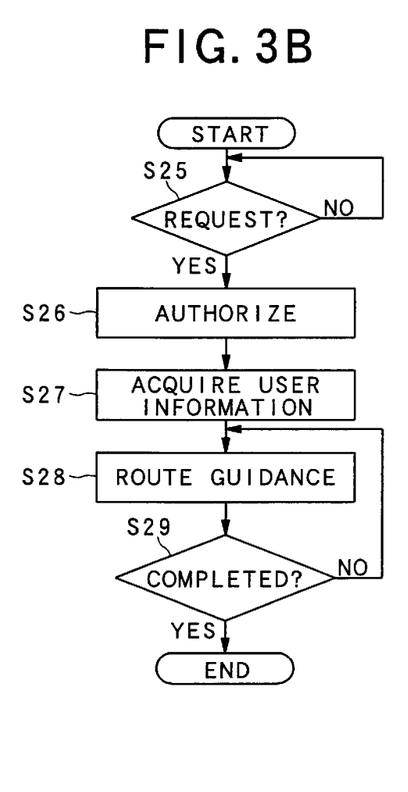
FIG. 3B is a flowchart showing a route guidance process according to the embodiment.
Figure 4:
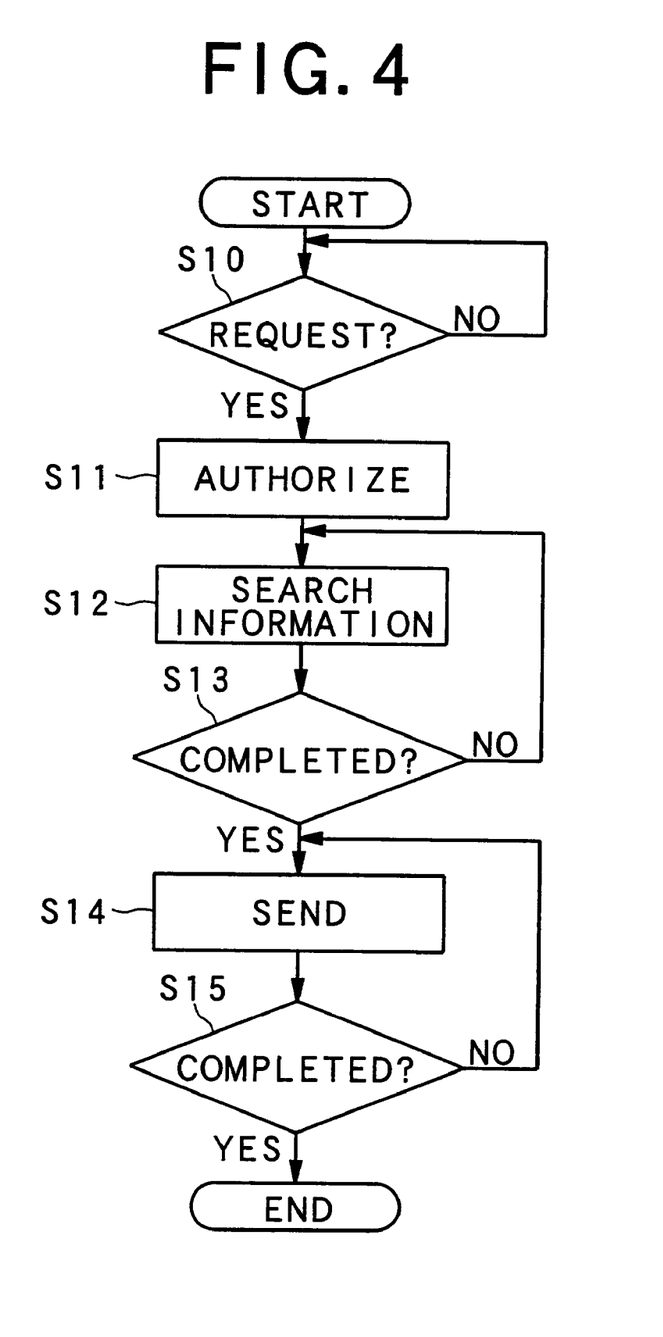
FIG. 4 is a flowchart showing an information search process according to the embodiment.

The navigation process to be performed by the navigation system S having the above configuration will be described. Referring to FIGS. 2 to 4, the description starts with steps taken by the server SV.

Referring to the flowchart shown in FIG. 2, a map search process will be described, in which steps are taken to search a map for display on the display subsystem 13 of any of the terminal units T.

In the map search process, the server SV constantly checks whether or not any terminal unit T sends a request for a map for display (step S1). If not (step S1; NO), the server SV waits. If so (step S1; YES), the server SV determines whether or not the requesting terminal unit T is authorized by the navigation system S according to this embodiment (step S2).

Upon completion of the authorization step, the server SV causes the map output section 1a to search for appropriate map information based on the received request by referring to the map information stored in the external storage subsystem 4 (steps S3 and S4). When the search step S4 is completed (step S4; YES), the searched map information is sent to the terminal unit T (step S5).

The server SV keeps checking whether or not all of the map information has been sent (step S6). If not (step S6; NO), the server SV continues sending the rest of the information, and if so (step S6; YES), it brings the series of map search steps to an end.

Referring next to the flowchart shown in FIG. 3A, a route calculation process will be described, in which steps are taken to calculate a route along which to guide a vehicle carrying any of the terminal units T thereon.

In the route calculation process, the server SV always checks whether or not a request containing a place of departure, a destination, and routing conditions (more specifically, whether or not highways are preferred, or calculations are to be made so that the vehicle drives along specific roads, etc.) has been sent from any terminal unit T (step S20). If not (step S20; NO), the server SV waits, and if so (step S20; YES), the server SV then determines whether or not that requesting terminal unit T is authorized by the navigation system S according to this embodiment (step S21).

Upon completion of the authorization step, the server SV extracts and acquires user information related to a user who owns the authorized terminal unit T from the external storage subsystem 4 (step S22), and then causes its routing section 1b to perform prescribed route calculation steps based on the destination, etc. contained in the request as well as the acquired user information (steps S23 and S24). When these route calculating steps are completed (step S24; YES), the server SV temporarily loads the calculated route information into the memory within the CPU 1, to terminate the route calculation process. The server SV may send the calculated route information to the terminal unit T so that the unit T causes its display subsystem 13 to display the received route information thereon.

Referring then to the flowchart shown in FIG. 3B, a route guidance process will be described, in which steps are taken to guide a vehicle along the calculated route, the vehicle carrying any of the terminal units T aboard.

In the route guidance process, the server SV constantly checks whether or not the terminal unit T has sent a request for starting route guidance (step S25). If not (step S25; NO), the server SV waits, and if so (step S25; YES), it determines whether or not the requesting terminal unit T is authorized by the navigation system S according to this embodiment (step S26).

Upon completion of the authorization step, the server SV extracts and acquires user information related to a user who owns the authorized terminal unit T from the external storage subsystem 4 for confirmation (step S27), and causes its routing section 1b to perform prescribed route guidance steps (steps S28 and S29) according to the request. Upon completion of the route guidance process (step S29; YES), the server SV terminates the route guidance process, which includes a step of acquiring current position information indicative of the vehicle's current position, a step of determining whether or not the acquired current position is on the previously calculated route, and a step of calculating the relationship between the vehicle's current position and a point of interest (an intersection for turn, a landmark, or the like) along the route, and sending the calculated relationship to the terminal unit T to inform the driver of the calculated relationship.

Referring next to the flowchart shown in FIG. 4, an information search process will be described, in which steps are taken to search information which is to be given to the driver of any of the terminal units T and which is related to the navigation process.

In the information search process, the server SV keeps checking whether or not any terminal unit T has sent a request for information to be given to the driver (step S10). If not (step S10; NO), the server SV waits. If so (step S10; YES), the server SV determines whether or not that requesting terminal unit T is authorized by the navigation system S according to this embodiment (step S11).

Upon completion of the authorization step, the server SV then causes its search section 1c to search for appropriate information from among the information stored in the external storage subsystem 4 based on the received request (steps S12 and S13). When the search is completed (step S13; YES), the server SV sends the searched information to the terminal unit T (step S14).

In the meantime, the server keeps checking whether or not all of the searched information has been sent (step S15). If not (step S15; NO), the server SV continues sending the rest of the information, and if so (step S15; YES), it brings the series of information search steps to an end.

Figure 5:
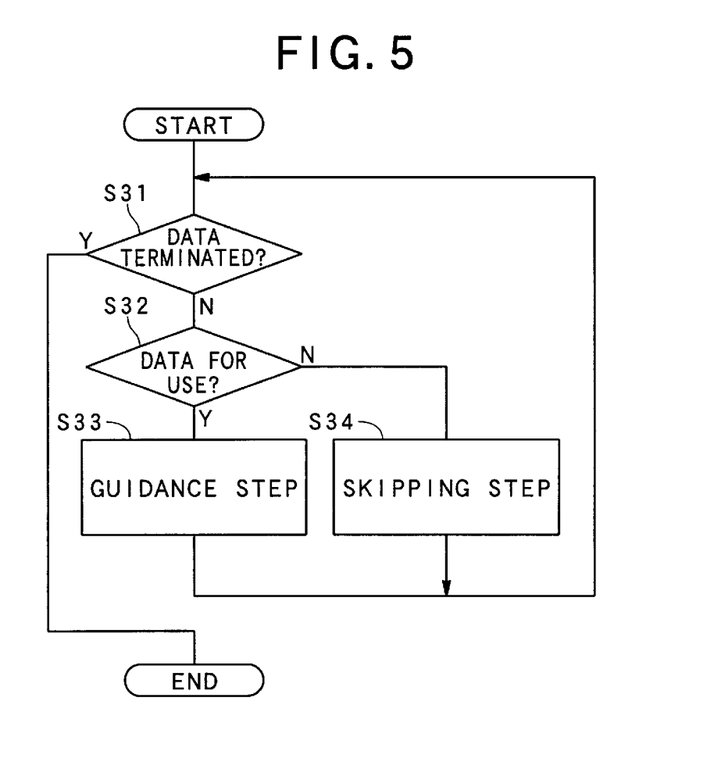
FIG. 5 is a flowchart showing a route guidance information process performed by the terminal unit.

Referring next to the flowchart shown in FIG. 5, a route guidance information process will be described, in which steps are taken by any of the terminal units T upon receipt of route guidance information. In this embodiment, the terminal unit T processes only one or more items of route guidance information which are necessary, while skipping other items of route guidance information.

This process is performed according to control effected by the processing subsystem 10. In step S31, control determines whether or not all the route guidance information received by any terminal unit T has been processed. If so, control terminates the process. Otherwise, control proceeds to step S32, in which control determines whether or not a first item of the route guidance information is necessary, i.e., that item of information is to be used in terms of its processing sequence. If so, control proceeds to step S33, and if not, to step S34.

In step S33, control performs predetermined guidance to display the item of route guidance information determined to be necessary in step S32 on the display subsystem 13 by a predetermined technique, or output the same from the speech output subsystem 14. After the guidance is completed, control returns to step S31. If the guidance has not been completed for all the route guidance information items, then control processes the next item of route guidance information (steps S32 to S34)

Figure 6:
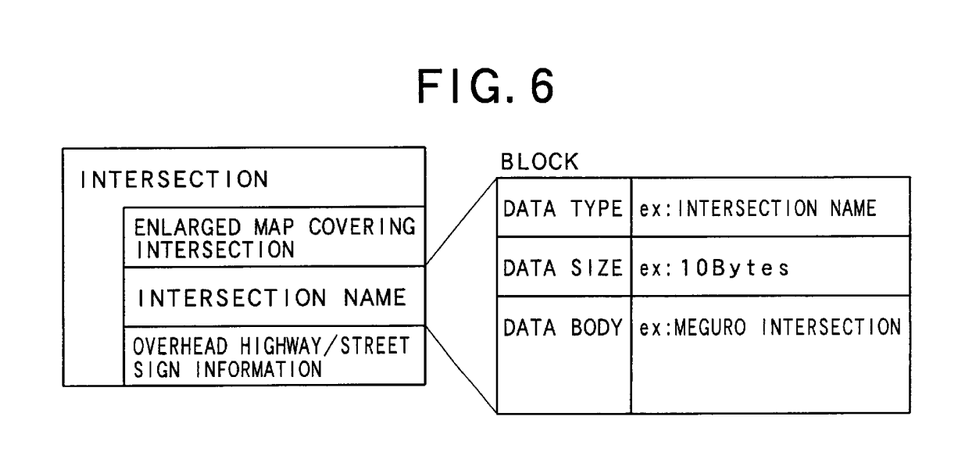
FIG. 6 is a flowchart showing an example in which steps S32 to S34 are followed.

FIG. 6 shows an example in which steps S32 to S34 are followed. This example refers to items of route guidance information about an intersection. That is, the items of route guidance information are sent, which are an enlarged map covering the intersection, the name of the intersection, and overhead highway/street sign information. In FIG. 6, each of the data blocks respectively representing the items of route guidance information consists of a data type, data size, and data body. The fields of the data type and size have fixed lengths, respectively. If an item of route guidance information is determined to be unnecessary when its data type is checked (step S32), then control does not read its data body by skipping as many bytes as its data size, thereby skipping the guidance (step S34). Otherwise, control reads its data body, thereby performing the guidance (step S33).

Even if any item of route guidance information is determined to be unnecessary, its data body may be read and stored for any future use.

As described above, in this embodiment, unnecessary items of route guidance information are skipped and only accepted items of route guidance information are processed to implement guidance. As a result, the server is no longer required to select and transmit route guidance information of a type that is uniquely compatible with each terminal unit, which in turn prevents complication of the system. Moreover, even when the number of items of route guidance information compatible with each terminal unit is increased, such as when new terminal unit products are marketed or when traditional terminal units are updated, the server is no longer required to change items of route guidance information for transmission according to the specifications of each terminal unit. This permits the server to reduce its management workload.

The data type determination in step S32 may be made dependent upon whether or not the subsequent guidance step can be performed by the terminal unit T based on the item of route guidance information under determination. That is, if the guidance step can be performed, all the corresponding items of route guidance information may be processed to implement the guidance without exception. In addition, it may be arranged so that the user can change items of route guidance information to be determined to be necessary in step S32, according to his or her settings, to allow the user to bypass a guidance step based on any item of route guidance information which the user thinks is unnecessary. In this case, the terminal unit T may be provided with input means (e.g., the input subsystem 16) that enables the user to enter one or more items of route guidance information which he or she thinks are necessary (or unnecessary).

It should be noted that the term "type of route guidance information" is herein construed to include any type of display (types of items) for use in route guidance.

According to the communication navigation system and method, etc. of the invention, only items of route guidance information determined to be necessary are used to implement guidance. Thus, even when each navigation terminal accepts only items of route guidance information uniquely compatible therewith, the route guidance information transmitting means or procedure no longer needs to process the information differently for each navigation terminal.

The entire disclosure of Japanese Patent Application No. 2001-233756 filed on Aug. 1, 2001 including the specification, claims, drawings and summary is incorporated herein by reference in its entirety.

What is claimed is:

1. A communication navigation system that performs navigation, using map data stored in a map database site and current position data about navigation terminals, by transmitting the map data to the navigation terminals via a communication network, the communication navigation system comprising:

a route guidance information transmitting device which transmits items of route guidance information including map data displayed when route guidance is performed to each of the navigation terminals via the communication network;

a determining device, provided at each of the navigation terminals, which determines whether or not the items of route guidance information transmitted by the route guidance information transmitting device are necessary; and a guidance device which performs guidance using only one or more items of route guidance information determined to be necessary by the determining device.

2. The communication navigation system according to claim 1, further comprising an input device which accepts an input of one or more of the items of route guidance information to be determined to be necessary by the determining device.

3. The communication navigation system according to claim 1, wherein the route guidance information transmitting device transmits displayed map data which covers a predetermined place to each of the navigation terminals via the communication network.

4. A communication navigation method for performing navigation, using map data stored in a map database site and current position data about navigation terminals, by transmitting the map data to the navigation terminals via a communication network, the communication navigation method comprising:

a route guidance information transmitting process for transmitting items of route guidance information including map data displayed when route guidance is performed to each of the navigation terminals via the communication network;

a determining process, performed by each of the navigation terminals, for determining whether or not the items of route guidance information transmitted by the route guidance information transmitting process are necessary; and a guidance process for performing guidance using only one or more items of route guidance information determined to be necessary by the determining process.

5. The communication navigation method according to claim 4, further comprising an input process for accepting an input of one or more of the items of route guidance information to be determined to be necessary by the determining process.

6. The communication navigation method according to claim 4, wherein the route guidance information transmitting process transmits displayed map data which covers a predetermined place to each of the navigation terminals via the communication network.

7. A navigation terminal that executes a communication navigation method for performing navigation, using map data stored in a map database site and current position data about the navigation terminal, by receiving the map data via a communication network, the navigation terminal comprising:

a determining device which determines whether or not items of route guidance information, which include map data displayed when route guidance is performed, transmitted by a route guidance information transmitting device are necessary, the route guidance information transmitting device being in the map database site and transmitting the items of route guidance information to the navigation terminal via the communication network; and a guidance device which performs guidance using only one or more items of route guidance information determined to be necessary by the determining device.

8. The navigation terminal according to claim 7, further comprising an input device for accepting an input of one or more of the items of route guidance information to be determined to be necessary by the determining device.

9. The navigation terminal according to claim 7, wherein the determining device determines whether or not the items of route guidance information, which includes displayed map data which covers a predetermined place, transmitted by the route guidance information transmitting device are necessary.

10. A route guidance information transmitting device that executes a communication navigation method for performing navigation, using map data stored in a map database site and current position data about navigation terminals, by transmitting the map data to the navigation terminals via a communication network, wherein the route guidance information transmitting device transmits items of route guidance information including map data displayed when route guidance is performed to each of the navigation terminals via the communication network, the navigation terminals comprising: a determining device for determining whether or not the items of route guidance information transmitted by the route guidance information transmitting device are necessary; and a guidance device for performing guidance using only one or more items of route guidance information determined to be necessary by the determining device.

11. A terminal for a navigation system, comprising:
a transmitter for transmitting a map request to a server;
a receiver for receiving map display information communicated from the server in response to the map request;
a processing system for executing a guidance process of the terminal, the processing system identifying map display information in the received map display information that is necessary for the guidance process and processing the necessary map display information; and
a display for displaying one or more maps based on the processing of the necessary map display information by the processing system during the guidance process.

12. The terminal according to claim 11, wherein the identifying of necessary map display information by the processing system is based on whether the map display information is used by the guidance process.

13. The terminal according to claim 11, further comprising:
an input device operable by a terminal user for inputting data designating certain map display information as necessary, wherein the processing system uses the inputted data to identify the necessary map display information.

14. A terminal for a navigation system, comprising:
a transmitter for transmitting a route guidance request to a server;
a receiver for receiving route guidance information communicated from the server in response to the route guidance request, the route guidance information being communicated in blocks each of which includes size data indicative of the size of the route guidance information in the block and type data indicative of the type of route guidance information in the block;
a processing system for checking the type data of each of the received blocks to determine if the block is a necessary block for a guidance process and, if not, using the size data of the block to skip to a next received block; and
a display for displaying route guidance information based on the blocks of route guidance information determined by the processing system to be necessary blocks.

15. The terminal according to claim 14, further comprising:
an input device operable by a terminal user for inputting type data designating one or more types of route guidance information,
wherein the processing system compares the input type data with the type data of each received block to determine whether the received block is a necessary block for the guidance process.

16. The terminal according to claim 14, wherein the size data and the type data are contained in fixed-size fields of the blocks.

17. The terminal according to claim 14, wherein the route guidance information comprises a map.

18. The terminal according to claim 14, wherein the transmitter, the receiver, the processing system and the display are embodied in an in-vehicle terminal.

19. The terminal according to claim 14, wherein the transmitter, the receiver, the processing system and the display are embodied in a portable terminal.

20. The terminal according to claim 14, wherein the transmitter, the receiver, the processing system and the display are embodied in a personal digital assistant.

21. The terminal according to claim 14, wherein the transmitter, the receiver, the processing system and the display are embodied in a wireless telephone.

22. A navigation system, comprising:
a server; and
a terminal comprising:
a transmitter for transmitting to the server a route guidance request;
a receiver for receiving route guidance information communicated over a communication network from the server in response to the route guidance request, the route guidance information being communicated in blocks each of which includes size data indicative of the size of the route guidance information in that block and type data indicative of the type of route guidance information in that block;
a processing system for checking the type data of each of the received blocks to determine if the block is a necessary block for a guidance process and, if not, using the size data of the block to skip to a next received block; and
a display for displaying route guidance information based on the blocks of route guidance information determined by the processing system to be necessary blocks.

* * * * *